(12) United States Patent
Fujita et al.

(10) Patent No.: US 12,466,315 B2
(45) Date of Patent: Nov. 11, 2025

(54) CONTROL DEVICE, CONTROL METHOD, AND NON-TRANSITORY STORAGE MEDIUM

(71) Applicant: TOYOTA JIDOSHA KABUSHIKI KAISHA, Toyota (JP)

(72) Inventors: Koichi Fujita, Toyota (JP); Jun Tohyama, Nisshin (JP); Daisuke Akaho, Nagoya (JP); Yuta Maniwa, Susono (JP); Natsumi Izawa, Kariya (JP); Shunichiroh Sawai, Tokyo-to (JP); Masahiko Nakamura, Okazaki (JP); Kenichiro Aoki, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 18/612,064

(22) Filed: Mar. 21, 2024

(65) Prior Publication Data
US 2024/0367582 A1 Nov. 7, 2024

(30) Foreign Application Priority Data
May 1, 2023 (JP) .................................. 2023-075850

(51) Int. Cl.
*B60Q 9/00* (2006.01)
(52) U.S. Cl.
CPC ............ *B60Q 9/00* (2013.01); *B60Q 2800/10* (2022.05)

(58) Field of Classification Search
CPC .............................. B60Q 9/00; B60Q 2800/10
See application file for complete search history.

(56) References Cited

U.S. PATENT DOCUMENTS

| 10,008,111 | B1* | 6/2018 | Grant | G08G 1/166 |
| 2016/0318481 | A1* | 11/2016 | Penilla | G07C 9/00309 |
| 2018/0237012 | A1* | 8/2018 | Jammoussi | B60W 50/082 |
| 2018/0345980 | A1 | 12/2018 | Morita et al. | |

FOREIGN PATENT DOCUMENTS

| JP | 2013134700 A | * | 7/2013 |
| JP | 2020-102252 A | | 7/2020 |

OTHER PUBLICATIONS

JP-2013134700-A original and machine translation. (Year: 2013).*

* cited by examiner

*Primary Examiner* — Frederick M Brushaber
(74) *Attorney, Agent, or Firm* — Oliff PLC (57) ABSTRACT

A control device includes a first processor. The first processor is configured to provide notification of a warning during autonomous driving to a first display unit of an onboard terminal installed in a vehicle; provide notification of the warning to a second display unit at a portable terminal carried by a vehicle occupant, via a second processor at the portable terminal; and in a case in which a predetermined condition has been satisfied, disable notification of the warning to the portable terminal and provide notification of the warning to the onboard terminal.

8 Claims, 5 Drawing Sheets

CONTROL DEVICE, CONTROL METHOD, AND NON-TRANSITORY STORAGE MEDIUM

CROSS-REFERENCE TO RELATED APPLICATION

This application is based on and claims priority under 35 USC 119 from Japanese Patent Application No. 2023-075850 filed on May 1, 2023, the disclosure of which is incorporated by reference herein.

BACKGROUND

Technical Field

The present disclosure relates to a control device, a control method, and a non-transitory storage medium that control notification to an onboard terminal installed in a vehicle and to a portable terminal carried by an occupant.

Related Art

For example, Japanese Patent Application Laid-open (JP-A) No. 2020-102252 discloses a driver monitoring system in which communication is performed between a portable terminal including a display screen and a camera disposed so as to be capable of capturing a side opposing the display screen, and a vehicle control device that controls the host vehicle, the driver of the host vehicle is monitored, based on an image captured by the camera, a determination is made as to whether or not the driver of the host vehicle is watching the display screen of the portable terminal during travel of the host vehicle, and in a case in which it is determined that the driver is watching the display screen of the portable terminal, a warning is issued.

Specifically, it is disclosed that a warning is issued using displays and sounds from the portable terminal and the vehicle in a case in the awareness level of the driver during autonomous driving is such that a warning is required.

When a driver is executing a secondary task other than driving during autonomous driving, there is a possibility that providing notification of a warning to a portable terminal may result in an act of searching for the portable terminal, delaying a response to a driving change or the like. Moreover, constantly notifying a portable terminal inside a vehicle of a warning may be irksome.

SUMMARY

The present disclosure provides a control device, a control method, and a non-transitory storage medium capable of appropriately providing notification of a warning during autonomous driving.

A control device according to a first aspect includes a notification unit that provides notification of a warning during autonomous driving to an onboard terminal installed in a vehicle and to a portable terminal carried by a vehicle occupant, and a control unit that controls the notification unit so as to disable notification to the portable terminal and provide notification of the warning to the onboard terminal in a case in which a predetermined condition has been satisfied.

According to the first aspect, the notification unit provides notification of a warning during autonomous driving to an onboard terminal installed in a vehicle and to a portable terminal carried by a vehicle occupant.

Moreover, in a case in which a predetermined condition has been satisfied, the control unit controls the notification unit so as to disable notification to the portable terminal and provide notification of the warning to the onboard terminal. This enables appropriate notification of warnings during autonomous driving.

A control device according to a second aspect is the control device of the first aspect, in which the control unit disables notification of the warning to the portable terminal of a driver in a case in which the portable terminal is not being held while the driver is performing a secondary task other than driving.

According to the second aspect, the occurrence of an act of searching for a portable terminal can be prevented, thereby eliminating the cause of a delay in response to a driving change or the like.

A control device according to a third aspect is the control device of the first aspect or the second aspect, in which the control unit disables notification of the warning to the portable terminal of a driver in a case in which the portable terminal of the driver is not disposed in a predetermined position.

According to the third aspect, although an act of searching for a portable terminal may occur in a case in which the portable terminal is not located at a fixed position, such as in a holder, disabling notification enables the occurrence of an act of searching for a portable terminal to be prevented, and enables a delay in response to a driving change or the like to be suppressed.

A control device according to a fourth aspect is any one of the first aspect to the third aspect, further including a designation unit that specifies the portable terminal of a driver, and in which the control unit disables notification of the warning to a portable terminal other than the portable terminal of the driver specified by the designation unit in a case in which there is more than one of the portable terminals present in the vehicle.

According to the fourth aspect, unnecessary notification to an occupant other than the driver can be reduced, and annoyance can be reduced.

A control device according to a fifth aspect is the fourth aspect, in which the control unit disables notification of the warning to a portable terminal other than the portable terminal of the driver in a case in which the warning is of a predetermined level of importance or lower.

According to the fifth aspect, it is possible to suppress notification of low importance to an occupant other than the driver, and to reduce annoyance.

As described above, the present disclosure enables the provision of a control device, a control method, and a non-transitory storage medium capable of appropriately providing notification of a warning during autonomous driving.

BRIEF DESCRIPTION OF THE DRAWINGS

Exemplary embodiments of the present invention will be described in detail based on the following figures, wherein.

DETAILED DESCRIPTION

Figure 1:
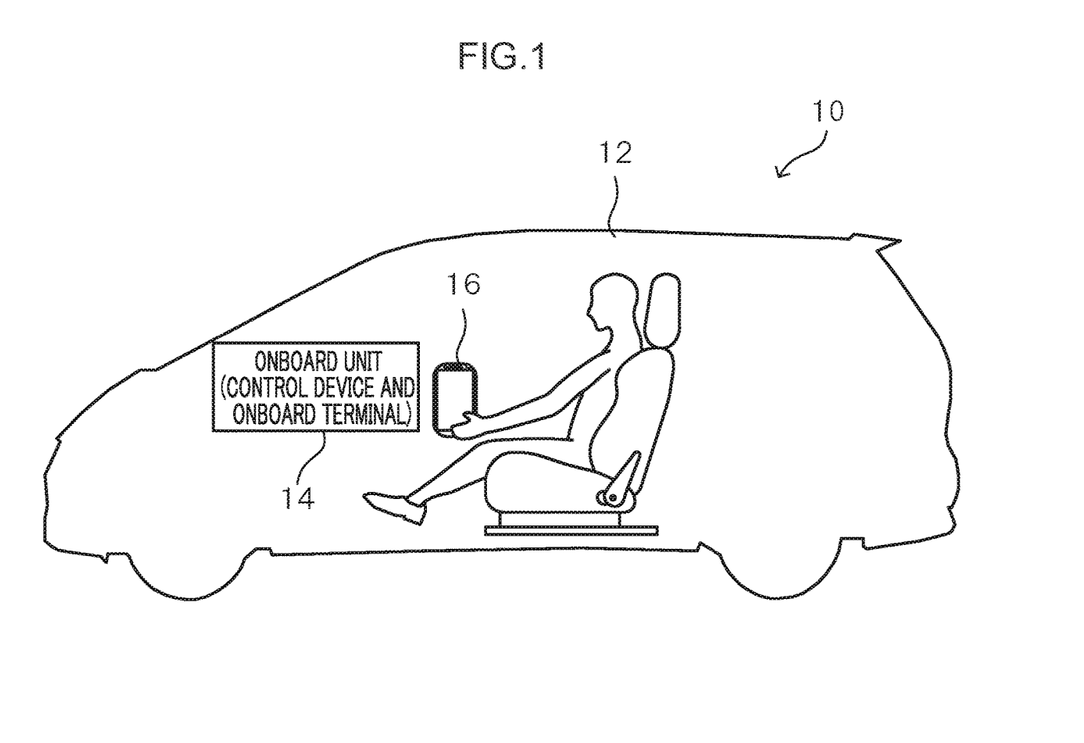
FIG. 1 is a diagram illustrating a schematic configuration of a vehicle information processing system according to the present exemplary embodiment.

In the following, an example of an embodiment of the present disclosure is explained with reference to the drawings. FIG. 1 is a diagram illustrating a schematic configuration of a vehicle information processing system according to the present exemplary embodiment.

A vehicle information processing system 10 according to the present exemplary embodiment includes an onboard unit 14 serving as an example of a control device and an onboard terminal installed in a vehicle 12, and a portable terminal 16 carried by an occupant of the vehicle 12.

The onboard unit 14 and the portable terminal 16 are connectable by various kinds of short-range wireless communication, such as Wi-Fi (registered trademark) and Bluetooth (registered trademark).

Figure 2:
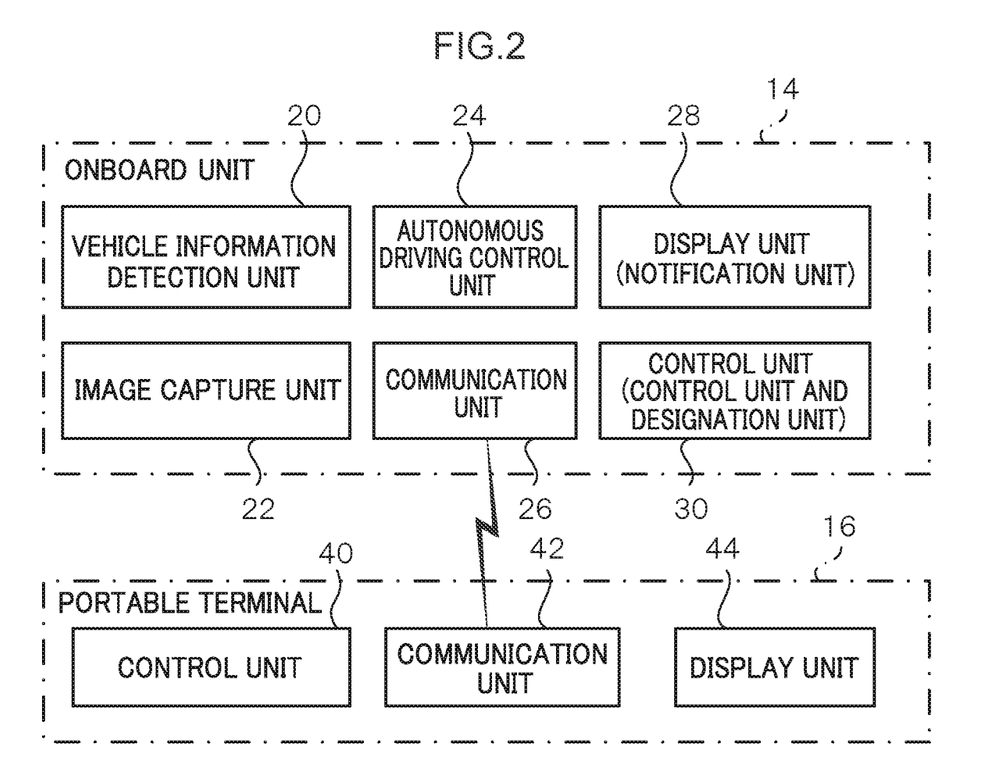
FIG. 2 is a functional block diagram illustrating a schematic configuration of an onboard unit and a portable terminal of a vehicle information processing system according to the present exemplary embodiment.

FIG. 2 is a functional block diagram illustrating a schematic configuration of the onboard device 14 and the portable terminal 16 of the vehicle information processing system 10 according to the present exemplary embodiment.

As illustrated in FIG. 2, the onboard unit 14 includes the functionality of a vehicle information detection unit 20, an image capture unit 22, an autonomous driving control unit 24, a communication unit 26, a display unit 28 as an example of a notification unit, and a control unit 30.

The vehicle information detection unit 20 detects vehicle information relating to the vehicle 12. For example, vehicle information such as position information, acceleration, accelerator position, distance to an obstacle in the vehicle surroundings, or the path of the vehicle 12 is detected. Specifically, the vehicle information detection unit 20 can utilize plural types of sensors and devices that acquire information indicating the nature of the situation of the peripheral environment of the vehicle 12. Examples of the sensors and devices include sensors installed in the vehicle 12 such as vehicle speed sensors, steering angle sensors, and acceleration sensors, and Global Navigation Satellite System (GNSS) devices, onboard communication devices, navigation systems, and radar devices. A GNSS device receives GNSS signals including time information from plural GNSS satellites and measures the position of the host vehicle 12. The accuracy of positioning by a GNSS device improves as the number of GNSS signals that can be received increases. An onboard communication device is a communication device that performs at least one of vehicle-to-vehicle communication with another vehicle 12 or road-to-vehicle communication with a roadside unit. A navigation system includes a map information storage unit that stores map information, and based on position information acquired from a GNSS device and map information stored in the map information storage unit, performs processing to display the position of the host vehicle 12 on a map, and processing to guide a route to a destination. Moreover, a radar device includes plural radars with different detection ranges from each other, and detects an object such as a pedestrian or another vehicle 12 present in the periphery of the host vehicle 12, and acquires the relative position and speed of the host vehicle 12 with respect to the detected object. Moreover, the radar device incorporates a processing device that processes detection results of peripheral objects. The processing device excludes roadside objects such as noise, guard rails, and the like from the monitoring target based on changes in relative positions and relative speeds to individual objects included in the most recent plural detection results, and follows and monitors pedestrians, other vehicles 12, and the like as the monitoring target object. The radar device then outputs information such as the relative position, relative speed, and the like with respect to the individual monitoring target objects. Note that in the present exemplary embodiment, all of these plural items of information may be detected as vehicle information, or any of the plural items of information may be detected as vehicle information.

The image capture unit 22 is installed inside the vehicle cabin, captures the surroundings of the driver and of the vehicle 12, and generates image data representing a captured image of a moving image. Moreover, as the surroundings of the vehicle 12, the image capture unit 22 captures at least one of a front side, a lateral side, or a rear side of the vehicle 12.

The communication unit 26 establishes communication with the portable terminal 16 inside the vehicle using short-range wireless communication, and performs transmission and reception of various information.

The autonomous driving control unit 24 controls autonomous driving of the vehicle 12 based on the detection results of the vehicle information detection unit 20 and the image capture results of the image capture unit 22. Note that the autonomous driving control unit 24 is assumed to be capable of autonomous driving at least at autonomous driving level 3 (conditional autonomous driving). Moreover, in the present exemplary embodiment, as regards the autonomous driving level, the definitions set forth by the Society of Automotive Engineers (SAE) shall be adopted.

More specifically, the autonomous driving control unit 24 controls switching between autonomous driving, in which the peripheral situation of the vehicle 12 and the situation of the vehicle 12 are determined and autonomous driving of the vehicle 12 controlled, and manual driving by an occupant. During autonomous driving, the autonomous driving control unit 24 assesses the host vehicle 12 and its peripheral situation based on information acquired from the vehicle information detection unit 20 and the image capture unit 22 in order to cause the vehicle 12 to travel autonomously. Then, according to the assessment result, autonomous driving control processing is performed to control actuators that drive the accelerator amount, the brake amount, the steering angle, and the like. In the autonomous driving control processing, a travel plan is generated that follows a predetermined target route based on the peripheral situation around the vehicle 12 and map information, and driving is controlled so as to cause the vehicle 12 to travel autonomously in accordance with the generated travel plan.

Moreover, during manual driving by an occupant, the autonomous driving control unit 24 can automatically initiate autonomous driving control processing in accordance with the behavior of the vehicle 12 and the peripheral situation, thereby assisting the occupant in driving the vehicle 12. In this case, the autonomous driving control unit 24 outputs information indicating the start of the autonomous driving control processing. Moreover, in cases in which there is a switch from manual driving to autonomous driving using autonomous driving control processing in accordance with occupant instruction, the autonomous driving control unit 24 outputs information indicating that a transition of driving sovereignty is to be performed; namely, information indicating the start of autonomous driving control processing. Moreover, during execution of the autonomous driving control processing, the autonomous driving control unit 24 can automatically end (cancel) the autonomous driving control processing in accordance with the behavior of the vehicle 12 or the peripheral situation, and perform processing to prompt the occupant to manually drive the vehicle 12. In this case, the autonomous driving control unit 24 outputs information indicating the end of the autonomous driving control processing in order to prompt the occupant to manually drive the vehicle 12. Moreover, in cases in which autonomous driving is switched to manual driving in accordance with occupant instruction, the autonomous driving control unit 24 outputs information indicating that a transition of driving sovereignty is to be performed; namely, information indicating the end of the autonomous driving control processing. Note that in case of autonomous driving level 3, it is necessary to check the driver; however, depending on the hand-held position of the portable terminal 16 and the posture of the driver, the portable terminal 16 may obscure the face range of the driver within the angle of view, based on its installed positional relationship with the image capture unit 22 that images the driver, and there may be cases in which the system is unable to grasp the state of the driver, which thus falls outside the operating conditions of autonomous driving. In this case, autonomous driving may be maintained in a case in which the driver has been checked from an image captured by the camera of the portable terminal 16.

The communication unit 26 communicates with the portable terminal 16 inside the vehicle 12 through various short-range wireless communication methods such as Wi-Fi (registered trademark), Bluetooth (registered trademark), or the like.

The display unit 28 serves as a first display unit, and provides various information to an occupant by displaying various information such as a warning. In the present exemplary embodiment, based on information output from the autonomous driving control unit 24, a warning indicating the ending of autonomous driving, for example, is displayed, and the driver is warned of a switch to manual driving. The display unit 28 may display information on a display provided at an instrument panel or the like, or may display information on a head-up display that projects an image onto glass.

Figure 3:
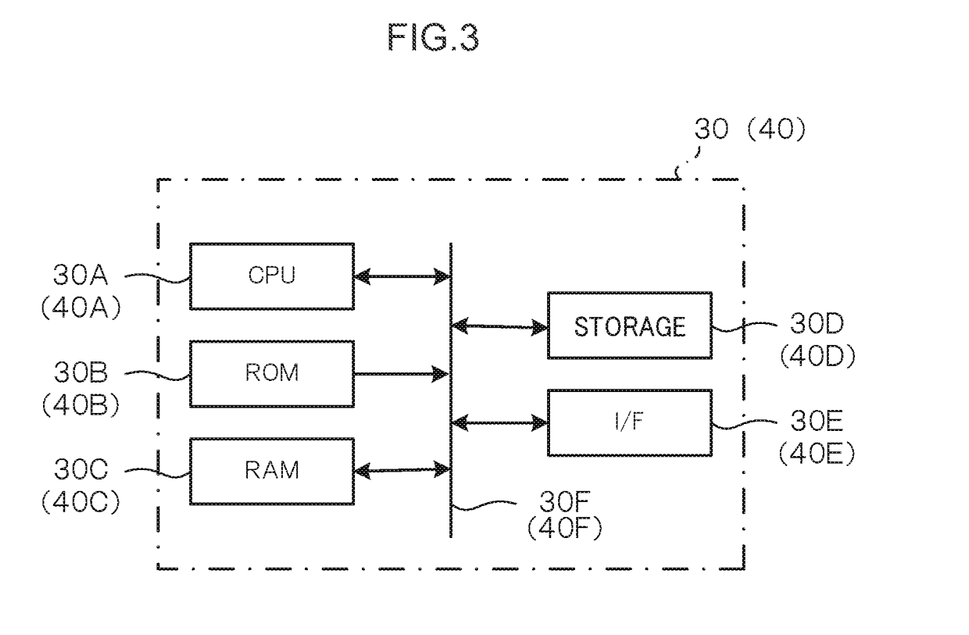
FIG. 3 is a block diagram illustrating the configuration of a control unit and a portable terminal of an onboard unit.

The control unit 30 is configured by a standard microcomputer including a central processing unit (CPU) 30A, read only memory (ROM) 30B, random access memory (RAM) 30C, a storage 30D, an interface (I/F) 30E, a bus 30F, and the like, as illustrated in FIG. 3. The control unit 30 performs notification control during autonomous driving by the CPU 30A, as a first processor, executing a program stored in the ROM 30B. Specifically, the control unit 30 performs control such that when the portable terminal 16 is connected during autonomous driving, both the vehicle 12 and the portable terminal 16 are notified, and when a predetermined condition is satisfied, notification to the portable terminal 16 is disabled, and only the vehicle 12 side is notified.

As illustrated in FIG. 2, the portable terminal 16 includes a control unit 40, a communication unit 42, and a display unit 44 serving as a second display unit.

As illustrated in FIG. 3, the control unit 40 is configured by a standard microcomputer including a CPU 40A, ROM 40B, RAM 40C, a storage 40D, an interface (I/F) 40E, a bus 40F, and the like.

The control unit 40 performs processing and the like that is linked to the onboard unit 14 by the CPU 40A, serving as a second processor, expanding and executing an information processing program stored in the ROM 40B at the RAM 40C.

The communication unit 42 communicates with the onboard unit 14 through various kinds of short-range wireless communication such as Wi-Fi (registered trademark) and Bluetooth (registered trademark).

The display unit 44 displays information for operating the portable terminal 16 and various information such as a screen provided by an application. In the present exemplary embodiment, a warning indicating the ending of autonomous driving, for example, is displayed in cooperation with the onboard unit 14 so as to enable the driver to be warned of a switch to manual driving.

Note that although not illustrated in FIG. 2, the portable terminal 16 also includes a position detection unit that detects the position of the portable terminal 16 via the global positioning system (GPS) or the like, an image capture unit such as a camera, and the like.

As in the present exemplary embodiment, a vehicle 12 that is capable of autonomous driving requires information to be transmitted to an occupant depending on the situation. For example, advance notification of a driving change, notification of a system state and a transition, a functional proposal from the system, notification of the state of the vehicle 12, and the like, are required. More specifically, in cases in which there is a need to reduce the level of autonomous driving or switch from autonomous driving to manual driving owing to some factor, it is necessary to notify the driver of information to prompt the driver to respond to peripheral monitoring, driving operations, and the like. Moreover, when the system executes a function, there are cases in which the intention of the driver needs to be confirmed.

In order to communicate information to an occupant in response to a situation, the vehicle information processing system 10 of the present exemplary embodiment enables notification of information by the onboard unit 14 and the portable terminal 16 carried by the driver.

However, in cases in which a driver is executing a secondary task other than driving during autonomous driving, notifying the portable terminal 16 of a warning may cause the driver to search for the portable terminal 16, thereby delaying a response to a driving change or the like. Moreover, constantly notifying the portable terminal 16 inside the vehicle of a warning may become irksome.

Accordingly, in the present exemplary embodiment, the control unit 30 performs control such that when the portable terminal 16 is connected during autonomous driving, both the vehicle 12 and the portable terminal 16 are notified, and when a predetermined condition is satisfied, notification to the portable terminal 16 is disabled, and only the vehicle 12 side is notified.

For example, if the driver is not holding the portable terminal 16 while performing a secondary task other than driving, when the portable terminal 16 is notified, an act of searching for the portable terminal 16 may be induced, creating the possibility of a delayed response to a driving change or the like. Therefore, notification of a warning to the portable terminal 16 of the driver is disabled.

Similarly, in cases in which the portable terminal 16 of the driver is not disposed at a predetermined position, when the portable terminal 16 is notified, an act of taking the portable terminal 16 to hand may be induced, creating the possibility of a delayed response to a driving change or the like. Therefore, notification of a warning to the portable terminal 16 of the driver is disabled. For example, in a case in which a holder capable of detecting the position of the portable terminal 16 is provided and the portable terminal 16 is not disposed in the holder, notification of a warning to the portable terminal 16 of the driver is disabled.

Moreover, in a case in which plural portable terminals 16 are present inside the vehicle, notification to the portable terminals 16 other than that of the driver is irksome to occupants other than the driver, and therefore, notification of warnings to terminals other than the portable terminal 16 of the driver is disabled.

Moreover, in a case in which plural portable terminals 16 are present inside the vehicle, since notification of unnecessary information to an occupant other than the driver is irksome, notification of warnings of no more than a predetermined level of importance to terminals other than the portable terminal 16 of the driver is disabled.

When autonomous driving level 3 is initiated (when the autonomous driving level rises), among the portable terminals 16 detected at the vehicle 12 side, the matter of which portable terminal 16 to connect to may be presented on a display such as the display unit 28, connection made to the selected portable terminal 16, and notification to the selected portable terminal 16 performed.

Figure 4:
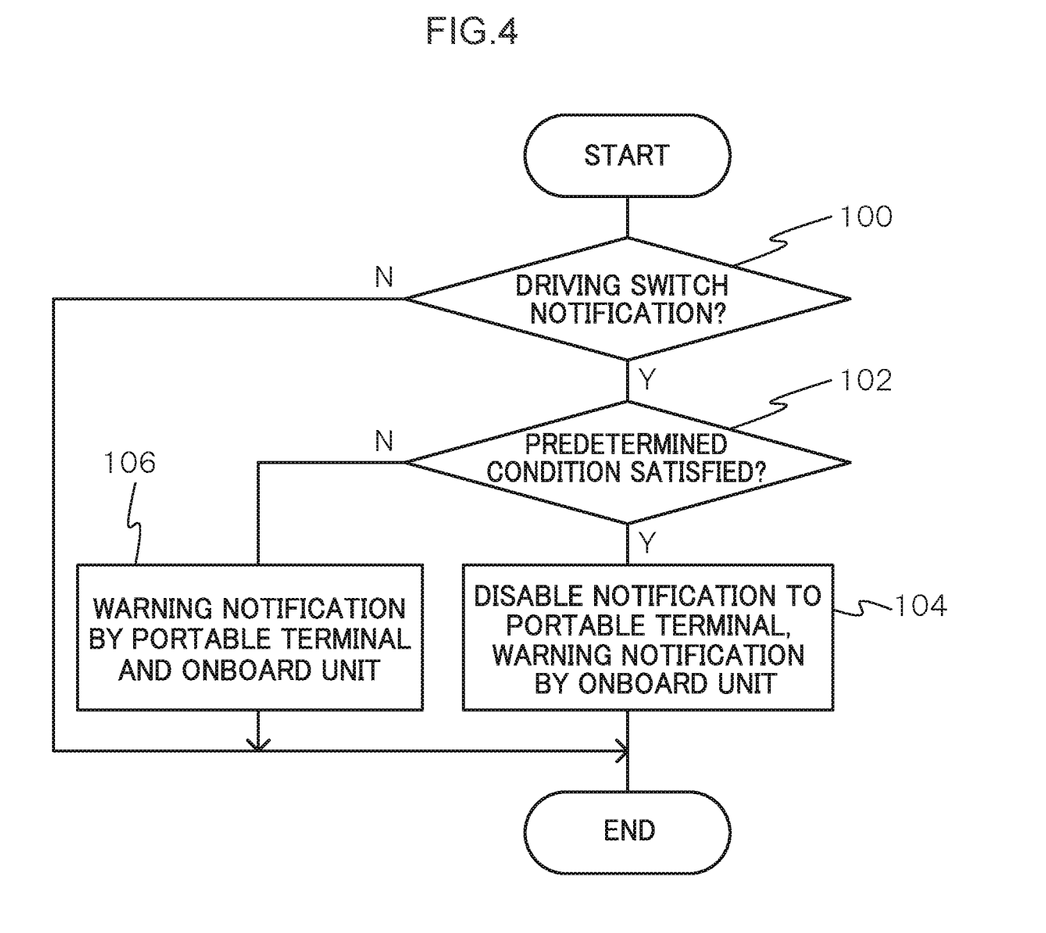
FIG. 4 is a flowchart illustrating an example of a flow of processing performed by a control unit of an onboard unit in a vehicle information processing system according to the present exemplary embodiment.

Next, explanation follows regarding specific processing performed by the control unit 30 of the onboard unit 14 in the vehicle information processing system 10 according to the present exemplary embodiment configured as described above. FIG. 4 is a flowchart illustrating an example of a flow of processing performed by the control unit 30 of the onboard unit 14 in the vehicle information processing system 10 according to the present exemplary embodiment. Note that the processing of FIG. 4 is started, for example, in a case in which communication between the onboard unit 14 and the portable terminal 16 has been established.

At step 100, the CPU 30A determines whether or not a driving switch notification has been received. This determination is made as to whether or not, for example, notification regarding a switch from autonomous driving to manual driving or a switch from manual driving to autonomous driving has been provided from the autonomous driving control unit 24. In a case in which the determination is affirmative, the processing transitions to step 102, while in a case in which the determination is negative, the processing is ended and other processing is performed. Note that an example of determining whether or not a driving switch notification has been received is described below as an example; however, a determination may be made as to whether or not another notification required to control a notification destination other than for a driving switch notification has been received.

At step 102, the CPU 30A determines whether or not a predetermined condition has been satisfied. This determination is performed, for example, to determine whether or not the portable terminal 16 is not being held while a driver is executing a secondary task other than driving during autonomous driving. Alternatively, it is determined whether or not the portable terminal 16 of the driver is not disposed at a predetermined position. Alternatively, it is determined whether or not plural portable terminals 16 are present inside the vehicle. In a case in which the determination is affirmative, the flow transitions to step 104, while in a case in which the determination is negative, the flow transitions to step 106.

At step 104, the CPU 30A disables notification to the portable terminal 16, performs a warning notification to the onboard unit 14, and ends the series of processing. While, for example, if the driver is not holding the portable terminal 16 while performing a secondary task other than driving, notifying the portable terminal 16 may induce an act of searching for the portable terminal and a delayed response to a driving change or the like, this enables a delay in response by the driver to be prevented. Similarly, in cases in which the portable terminal 16 of the driver is not disposed at a predetermined position, although there is a possibility that notifying the portable terminal 16 will result in an act of taking the portable terminal 16 to hand and a delayed response to a driving change or the like, this enables a delay in response by the driver to be prevented. Further, in cases in which plural portable terminals 16 are present inside the vehicle, while notifying all the portable terminals 16 is irksome to occupants other than the driver, unnecessary notification can be suppressed. Note that in this case, notification of only warnings with no more than a predetermined level importance or to the portable terminals 16 is disabled, and for warnings with a higher importance than the predetermined level, warning notification may be performed by the portable terminals and the onboard unit 14.

At step 106, the CPU 30A notifies the portable terminal 16 and the onboard unit 14 of a warning, and ends the series of processing.

Such processing enables the notification destination of the warning to be changed according to the situation, enabling notification of a warning during autonomous driving to be appropriately performed.

For example, when a driver is not holding the portable terminal 16 during execution of a secondary task other than driving, notification of warnings to the portable terminal 16 is disabled, and therefore, the occurrence of an act of searching for the portable terminal 16 can be prevented, and a factor causing a delay in response to a change in driving or the like can be eliminated.

Moreover, in cases in which the portable terminal 16 of the driver is not disposed at a predetermined position, notification of warnings to the portable terminal 16 is disabled, and therefore, the occurrence of an act of searching for the portable terminal 16 can be prevented, and a delay in response to a driving change or the like can be suppressed.

Moreover, in a case in which plural portable terminals are present inside the vehicle, notification of warnings to the portable terminals 16 is disabled, enabling a reduction of annoyance.

Although an example in which the portable terminal 16 is not notified in a case in which plural portable terminals 16 are present inside the vehicle has been described in the above exemplary embodiment, there is no limitation thereto. For example, a configuration may be adopted in which the control unit 30, serving as a designation unit, specifies the portable terminal 16 of the driver, disables notification to devices other than the specified portable terminal 16 of the driver, and notifies the portable terminal 16 of the driver of the warning. This enables unnecessary notification to occupants other than the driver to be reduced, and also enables annoyance to be reduced. In this case, as a method of specifying the portable terminal 16 of the driver, identification information of the portable terminal 16 can be specified by registering in advance. For example, the identification information of the portable terminal 16 of the driver may be recorded in advance, and the identification information may be specified by checking the identification information when communication by short-range wireless communication is established. Moreover, for example, in a case in which there is a portable terminal 16 that is registered as a digital key, the designation unit may identify this portable terminal 16 as the portable terminal 16 of the driver.

Figure 5:
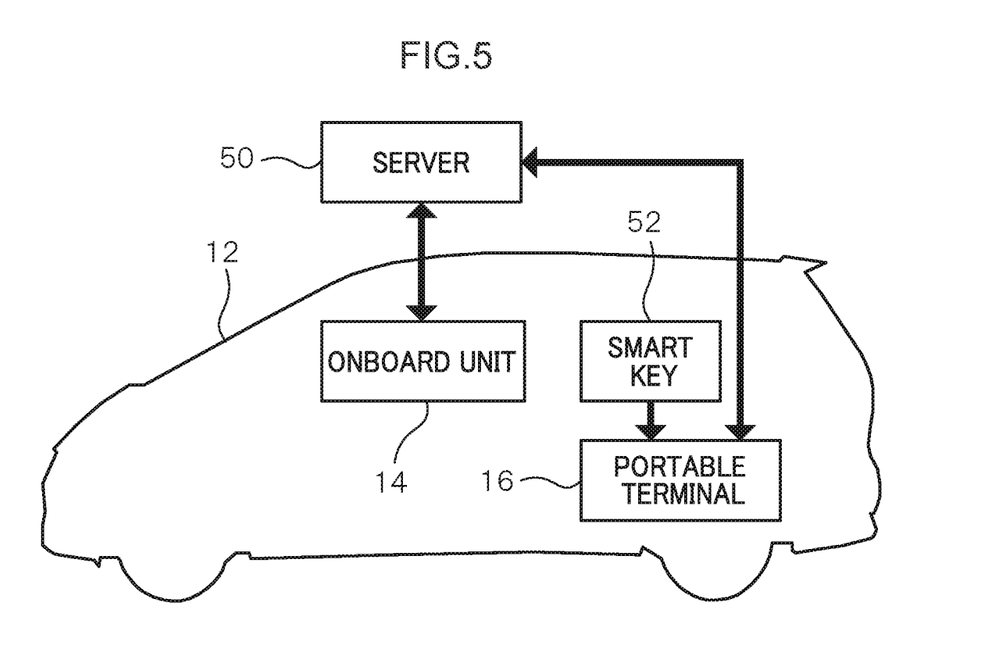
FIG. 5 is a diagram illustrating an example in which an onboard unit acquires identification information for a portable terminal of a driver via a server.

In addition, as illustrated in FIG. 5, the onboard unit 14 may acquire the identification information of the portable terminal 16 of the driver via the server 50. In this case, the portable terminal 16 of the driver may be specified based on a signal from the portable terminal 16 that has detected the smart key 52 of the vehicle. More specifically, the smart key 52 transmits an authentication signal around the smart key 52 itself. The portable terminal 16 situated in the vicinity of the smart key 52 receives the authentication signal transmitted from the smart key 52. The portable terminal 16 provides notification to the server 50 of a signal indicating that the smart key 52 has been detected. The server 50 transmits the identification information of the portable terminal 16 that has detected the smart key 52 to the communication unit 26. The communication unit 26 receives the identification information of the portable terminal 16 transmitted from the server 50 to acquire the identification information of the portable terminal 16 of the driver.

Further, the designation unit may appropriately set the timing at which to specify the portable terminal 16 of the driver. For example, the designation unit may specify the portable terminal 16 of the driver when the power of the vehicle is switched from the off state to the on state. Moreover, for example, the designation unit may specify the portable terminal 16 of the driver each time the vehicle is in a stationary state despite the power of the vehicle being on. Note that the stationary state is, for example, a case in which the shift position of the vehicle is in parking. Alternatively, for example, the designation unit may specify the portable terminal 16 of the driver at regular intervals. Alternatively, for example, the portable terminal 16 of the driver may be specified when autonomous driving of the vehicle has become level 3 autonomous driving.

Although an example in which a notification destination of a warning is controlled has been described in the above exemplary embodiment, the present invention is not limited to notification of a warning. For example, when informing an occupant of various information, similarly to the above exemplary embodiments, the information destination may be controlled according to a predetermined condition.

Although explanation has been given regarding processing performed by the vehicle information processing system 10 in the above exemplary embodiments as software processing performed by executing a program, there is no limitation thereto. Processing may be performed using hardware such as a graphics processing unit (GPU), an application specific integrated circuit (ASIC), or a field-programmable gate array (FPGA). Alternatively, the processing may combine both software and hardware. In cases in which software processing is employed, the programs may be stored and distributed on various non-transitory storage media.

Moreover, the present disclosure is not limited to the above description, and it will be apparent that various other modifications may the implemented within a range not departing from the gist of the present disclosure.

What is claimed is:

1. A control device, comprising:
a first processor configured to:
provide notification of a warning, during autonomous driving, to a first display unit of an onboard terminal installed in a vehicle;
provide notification of the warning to a second display unit at a portable terminal carried by a vehicle occupant, via a second processor at the portable terminal;
in a case in which a predetermined condition has been satisfied, disable notification of the warning to the portable terminal and provide notification of the warning to the onboard terminal; and
in a case in which the portable terminal is not being held by the vehicle occupant while the vehicle occupant is performing a secondary task other than driving, disable notification of the warning to the portable terminal.

2. The control device of claim 1, wherein the first processor is configured to disable notification of the warning to the portable terminal, in a case in which the portable terminal is not disposed in a predetermined position.

3. The control device of claim 1, wherein the first processor is further configured to:
disable notification of the warning to a portable terminal other than the portable terminal of the vehicle occupant, in a case in which a plurality of portable terminals are present in the vehicle.

4. The control device of claim 3, wherein the first processor is configured to disable notification of the warning to the portable terminal other than the portable terminal of the vehicle occupant, in a case in which the warning is of a predetermined level of importance or lower.

5. The control device of claim 1, wherein the first processor is configured to determine whether the portable terminal is not being held by the vehicle occupant while the vehicle occupant is performing the secondary task.

6. The control device of claim 1, wherein the first processor is configured to detect whether the portable terminal is not being held by the vehicle occupant while the vehicle occupant is performing the secondary task.

7. A control method executed by a processor, the control method comprising:
providing notification of a warning during autonomous driving to a first display unit of an onboard terminal installed in a vehicle;
providing notification of the warning to a second display unit at a portable terminal carried by a vehicle occupant, via a second processor at the portable terminal;
in a case in which a predetermined condition has been satisfied, disabling notification of the warning to the portable terminal and providing notification of the warning to the onboard terminal; and
in a case in which the portable terminal is not being held by the vehicle occupant while the vehicle occupant is performing a secondary task other than driving, disabling notification of the warning to the portable terminal.

8. A non-transitory storage medium storing a control program executable by a processor to perform processing, the processing comprising:
providing notification of a warning during autonomous driving to a first display unit of an onboard terminal installed in a vehicle;
providing notification of the warning to a second display unit at a portable terminal of a vehicle occupant;
in a case in which a predetermined condition has been satisfied, disabling notification of the warning to the portable terminal and providing notification of the warning to the onboard terminal; and
in a case in which the portable terminal is not being held by the vehicle occupant while the vehicle occupant is performing a secondary task other than driving, disabling notification of the warning to the portable terminal.

* * * * *